3,214,387
PREPARATION OF CATALYSTS FOR THE
POLYMERIZATION OF EPOXIDES
Fred N. Hill, South Charleston, and Frederick E. Bailey, Jr., and John T. Fitzpatrick, Charleston, W. Va., assignors to Union Carbide Corporation, a corporation of New York
No Drawing. Filed June 10, 1960, Ser. No. 35,141
13 Claims. (Cl. 252—431)

This invention relates to the preparation of compositions which are catalytically active for the polymerization of epoxide compounds which contain a cyclic group composed of two carbon atoms and one oxygen atom, i.e. an oxirane group.

The compositions prepared in accordance with the teachings disclosed herein can be advantageously and effectively employed as catalysts in the solution polymerization of, for example, ethylene oxide to produce high molecular weight solid poly(ethylene oxide). It is pointed out at this time that the term "solution polymerization process," as used herein including the appended claims, refers to polymerization in the presence of an inert normally-liquid organic vehicle in which the monomeric reagent employed and the resulting polymeric product are soluble.

The novel compositions of the invention are prepared by the mutual reaction and/or interaction of an alkaline earth metal hexammoniate, an olefin oxide, and a hydroxy-containing organic compound, e.g., alkanol and alkanediol. The reaction is carried out in a liquid ammonia medium. In principle, the reaction temperature can range from above about the freezing point of ammonia, i.e., about −78° C., to the critical temperature of ammonia, i.e., about +133° C. The preservation of a liquid ammonia phase obviously requires pressurized equipment at reaction temperatures above the atmospheric boiling point of ammonia, i.e., about −33° C. A reaction temperature in the range of from above about the freezing point of the liquid ammonia medium to about 25° C. is preferred. In a more preferred aspect the upper temperature is about 10° C.

The ratio of the three components, i.e., alkaline earth metal hexammoniate, olefin oxide, and hydroxy-containing organic compound can be varied over a wide range in the preparation of the novel compositions. However, the total amount of olefin oxide plus hydroxy-containing organic compound should be sufficient to essentially completely react with the alkaline earth metal hexammoniate. It is desirable to avoid the use of excessive hydroxy-containing organic compound, that is, an amount of hydroxy-containing organic compound which is greater than the theoretical quantity necessary to react with the alkaline earth metal hexammoniate (taking into account the quantity of olefin oxide employed). It has been observed that the presence of substantial quantities of unreacted hydroxy-containing organic compound (and/or some unreacted olefin oxide or the corresponding alcohol resulting from the reduction of the olefin oxide) in the resulting catalytically-active reaction product mixture causes a decrease in the polymerization rate when said reaction product mixture is employed as the catalyst in the solution polymerization of olefin oxides, e.g., ethylene oxide. This disadvantage, i.e., reduced polymerization rate, oftentimes can be overcome by heating said product mixture under reduced pressure to thus remove the unreacted reactant, or by washing said product mixture with an inert normally-liquid organic medium, e.g., heptane, followed by drying under reduced pressure. However, when the unreacted reactant is not readily removed from the reaction product mixture, it is preferred to employ an amount of olefin oxide plus hydroxy-containing organic compound which is sufficient to essentially completely react with the alkaline earth metal hexammoniate.

The reaction is conducted, as indicated previously, in an excess liquid amonnia medium. Thus, highly desirable catalytic compositions can be prepared by employing from about 0.05 to about 0.1 mol of olefin oxide per mol of metal hexammoniate, and from about 1.95 to about 1.0 mol of hydroxy-containing organic compound per mol of metal hexammoniate. Extremely desirable catalytic compositions can be prepared by employing from about 0.8 to about 1.0 mol of olefin oxide per mol of metal hexammoniate, and from about 1.2 to about 1.0 mol of hydroxy-containing organic compound per mol of metal hexammoniate. Preferred catalytic compositions are prepared by employing essentially equimolar amounts of olefin oxide, hydroxy-containing organic compound, and metal hexammoniate. It should be noted that the alkaline earth metal hexammoniate, $M(NH_3)_6$ wherein M can be calcium, barium or strontium, contains alkaline earth metal in the zero valence state. Thus, the concentration or mol ratio of the olefin oxide and hydroxy-containing organic compound is more conveniently based upon alkaline earth metal per se rather than alkaline earth metal hexammoniate.

The olefin oxides contemplated as reagent in the preparation of the novel catalytic compositions are those containing solely carbon, hydrogen, and oxirane oxygen which is bonded to vicinal or adjacent carbon atoms to form an epoxy group, i.e.,

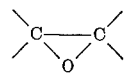

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-tirmethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]hexane, 3-methyl-6-oxabicyclo[3.1.0]hexane, 4-ethyl-6-oxabicyclo[3.1.0]hexane, and the like. Lower olefin oxides are preferred, that is, ethylene oxide, propylene oxide, 1,2-epoxybutane, 2,3-epoxybutane, and the like.

The hydroxy-containing organic compounds which are employed in the preparation of the catalytic compositions are preferably alkanols, cycloalkanols, alkanediols, cycloalkanediols, phenols, and the like. Illustrative hydroxy-containing organic compounds include, for example, methanol, ethanol, n-propanol, isopropanol, n-butanol, sec.-butanol, 1-butanol, the pentanols, the hexanols, 2-ethylhexanol, the octanols, the dodecanols, octadecanol, cyclopentanol, cyclohexanol, cycloheptanols, lower alkyl substituted-cycloalkanols which contain from 5 to 7 carbon atoms in the cycloaliphatic nucleus, 2-methylcyclopentanol, 3-butylcyclohexanol, 3-isopropylclycloheptanol ethylene glycol, the propylene glycols, the butylene glycols, 1,5-pentanediol, 2-ethylhexane-1,3-diol, 1,6-hexanediol, the octanediols, phenol, cresol, and the like. Alkanols and alkanediols which contain up to four carbon atoms are preferred. Ethylene glycol is especially preferred.

The compositions prepared in accordance with the teachings disclosed herein are extraordinarily active catalysts for effecting the solution polymerization of olefin oxides, particularly ethylene oxide, at elevated temperatures, e.g., above about 70° C., to produce relatively high molecular weight polymeric products. When employing the compositions of the invention as catalysts in the above-described solution polymerization process, the rates of polymerization are, in general, markedly superior than the polymerization rates which result from the use of metal alcoholates which are prepared, for example, by the reaction of an alkaline earth metal hexammoniate with a hydroxy-containing organic compound, e.g., an alkanol or alkanediol. Moreover, it has been observed that the use of the compositions of the invention as catalysts for the solution polymerization of ethylene oxide results in a very low induction period prior to the commencing of the polymerization reaction. For instance, induction periods ranging from seconds to about 30 minutes have been recorded whereas induction periods up to 18 hours, and longer, are manifest by using divalent metal alcoholate catalysts prepared by reacting the corresponding metal with the appropriate alcohol, or by reacting divalent metal hexammoniate with the appropriate alcohol. These unexpected and unobvious results, i.e., superior polymerization rate and exceedingly low induction period, is of special significance since, in many instances, it is highly desirable to prepare relatively high molecular weight olefin oxide polymers via the solution polymerization route rather than the bulk polymerization route. Among the advantages which accrue by conducting the polymerization process in the presence of an inert normally-liquid organic vehicle include, for example, ease of stirring the reaction mixture, the feasibility and practicality of using heat exchangers to maintain a uniform reaction temperature, ease of removal of the reaction product mixture from the reaction zone, ease of dispersing the catalyst in the reaction mixture, and the like.

As indicated previously, the preparation of the catalytic compositions can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and hydroxy-containing organic reagents, preferably as a mixture. If desired, the olefin oxide and the hydroxy-containing organic reagents can be added separately; however, it is preferred that the separate addition of said reagents to the ammonia solution be conducted simultaneously. During the catalyst preparation agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried, if desired, in an inert normally-liquid organic vehicle such as, for example, the lower dialkyl ethers of alkylene glycols, e.g., dimethyl ether, diethyl ether, or dipropyl ether of ethylene glycol, of propylene glycol, of diethylene glycol, and the like; saturated aliphatic and cycloaliphatic hydrocarbons, e.g., hexane, heptane, cyclohexane, cyclopentane, cycloheptane, lower alkyl susbtituted cyclohexane, and the like.

The compositions of the invention are useful in catalyzing the polymerization of epoxide monomers which contain an oxirane group, i.e., a cyclic group composed of two carbon atoms and one oxygen atom. Illustrative epoxide monomers include the epoxidized mono-olefinic hydrocarbons and the epoxidized mono-cycloolefinic hydrocarbons, e.g., ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5 - benzyl - 2,3 - epoxyheptane, 4 - cyclohexyl - 2,3 - epoxypentane, styrene oxide, ortho-, meta-, para-ethylstyrene oxide, glycidyl benzene, 7-oxabicyclo[4.1.0]heptane, 6-oxabicyclo[3.1.0]hexane, 4-propyl-7-oxabicyclo[4.1.0]heptane, 3 - amyl - 6 - oxabicyclo [3.1.0]hexane, and the like.

The compositions of the invention are employed in catalytically significant quantities. In general a catalyst concentration in the range of from about 0.02, and lower, to about 10, and higher, weight percent, based on the weight of total monomeric feed, is suitable. A catalyst concentration in the range of from about 0.1 to about 3 weight percent, based on the weight of total monomeric feed, is preferred. For optimum results, the particular catalyst employed, its preparation, the nature of the epoxide monomer(s) employed, the temperature at which the polymerization reaction is conducted, and other factors will largely determine the desired catalyst concentration.

The polymerization reaction preferably is conducted at elevated temperatures, e.g., above about 70° C. to about 150° C., and higher. The optimum reaction temperature depends on various factors such as the nature of the epoxide monomer(s) employed, the particular catalyst employed, the concentration of the catalyst, the preparation of the catalyst, and the like. The reaction time will vary over a wide range depending on such factors as illustrated previously, for example, from minutes to several hours.

When polymerizing an admixture containing two different epoxide monomers, the proportions of said epoxide monomers can vary over the entire range. Preferably the concentration of either epoxide monomer is in the range of from about 5 to about 95 weight percent, based on the total weight of said epoxide monomers.

The polymerization reaction can be carried out via the bulk, suspension, or solution polymerization routes. The suspension and solution techniques involve the use of an inert normally-liquid organic medium such as, for instance, the aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like. As discussed previously, the compositions prepared in accordance with the practice of the invention are extremely effective in catalyzing the polymerization, for example, of ethylene oxide via the soltuion polymerization route, i.e., in the presence of an inert normally-liquid organic medium in which the ethylene oxide reagent and the resulting oxide polymeric product are soluble. Representative organic media suitable in the solution polymerization route include, for example, the oxygenated organic compounds and the aromatic hydrocarbons illustrated above.

The polymers prepared in accordance with the teachings disclosed herein are a useful class of compounds which can range from the wax-like state to the tough solid state. The ethylene oxide polymers which have a reduced viscosity value in the range of from about 0.5 to about 10, and higher, preferably from about 1.0 to about 5, are especially desirable compounds. These ethylene oxide polymers appear to form homogeneous systems with water in all proportions. The water solutions are viscous, the viscosity increasing both with the concentration of the polymer and the molecular weight of the polymer. The ethylene oxide polymer show little change in melting point with increased molecular weight and the melting point, as measured by change in stiffness with temperature, is found to be about 65° C.±2° C. The crystallization temperature, as determined by measuring the break in the cooling curve, is about 55° C.

The polymers are useful as thickeners, lubricants, sizing agents, and the like. The water-soluble and water-insoluble solid polymers are also useful in the preparation of films by conventional techniques such as by milling on a two-roll mill, calendering, solvent casting, and the like. The homopolymers of the lower olefin oxides and the copolymers containing a lower olefin oxide as a comonomer are preferred polymeric classes. Those copolymers containing ethylene oxide, and, in particular, greater than about 50 weight percent ethylene oxide, are especially preferred polymeric classes.

By the term "reduced viscosity," as used herein including the appended claims, is meant a value obtained by dividing the specific viscosity by the concentration of the polymer in solution, the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

The following examples are illustrative.

*Example 1*

Liquid ammonia (195 grams) was added to a resin flask (maintained in a Dry Ice-acetone bath, the temperature of which was about −70° C.). Calcium metal nodules (5 grams; 0.125 mol) was then dissolved in the stirred liquid ammonia. The characteristic deep blue color of calcium hexammoniate appeared. To the resulting solution there were slowly added a mixture of ethylene oxide (5.2 grams; 0.12 mol) and ethylene glycol (7.44 grams; 0.12 mol). Approximately 30 minutes afterwards, 173 grams of toluene was added to the resulting admixture. The external Dry Ice-acetone bath then was removed, and the flask was exposed to room temperature conditions, i.e., approximately 23° C., until the excess liquid ammonia had weathered or evaporated from the system. There was obtained a finely-divided solid suspension in toluene.

*Example 2*

To a Pyrex test tube, there were charged 3 milliliters of the suspension prepared according to Example 1, 15 grams of toluene, and 15 grams of ethylene oxide. The tube was sealed and then gently agitated at 90° C. for a period of 19 hours. The polymerization reaction commenced immediately. There was obtained a solid polymeric product which had a reduced viscosity value of 2.7. The conversion of monomer to polymer was 93 percent.

In an analogous manner, the use of a catalyst which is prepared according to Example 1 except that 0.12 mol of strontium is substituted for the 0.12 mol of calcium results, under the conditions noted in the previous paragraph, in the production of a solid polymeric product.

*Example 3*

Liquid ammonia (300 milliliters) was added to a resin flask (maintained in a Dry Ice-acetone bath, the temperature of which was about −70° C.). Calcium metal (5 grams; 0.125 mol) was then dissolved in the stirred liquid ammonia. To the resulting solution there were slowly added a mixture of ethylene oxide (7.44 grams; 0.12 mol) and ethylene glycol (5.2 grams; 0.12 mol). The external Dry Ice-acetone bath subsequently was removed, and the flask was exposed to room temperature conditions, i.e., approximately 23° C., until the excess liquid ammonia had weathered or evaporated from the system. The residue, a light gray friable solid, then was ground to a finely divided powder.

*Example 4*

To a two-liter stainless steel autoclave, there were charged 572 grams of toluene, 271 grams of ethylene oxide, and a quantity of the finely divided solid product prepared in Example 3 supra, said solid product containing 0.29 gram of calcium calculated as the metal. The autoclave was heated to about 105° C. and maintained thereat for a period of about 94 hours. The maximum pressure was approximately 100 p.s.i.g. The reaction mixture was continuously stirred. Subsequently, the reaction product mixture was precipitated in about 3 liters of heptane, recovered therefrom, and dried under reduced pressure at 25° C. to 30° C. There was obtained a solid polymeric product which had a reduced viscosity value of 1.09. The conversion of monomer to polymer was 85 percent.

*Example 5*

A catalyst was prepare in the same manner as set forth in Example 1 supra except that 1,2-propylene oxide (7 grams; 0.12 mol) was used in lieu of ethylene oxide.

To a Pyrex test tube, there were charged 3 milliliters of the suspension prepared as described above, 15 grams of toluene, and 15 grams of ethylene oxide. The tube was sealed and then gently agitated at 90° C. for a period of 26 hours. A 10–15 minute induction period was observed. There was obtained a solid polymeric product which had a reduced viscosity value of 2.1. The conversion of monomer to polymer was 53 percent.

In an analogous manner, the use of a catalyst which is perpared according to Example 1, supra, except that 0.12 mol of barium is substituted for the 0.12 mol of calcium results, under the conditions noted in the previous paragraph, in the production of a solid polymeric product.

*Example 6*

A catalyst was prepared in the same manner as set forth in Example 1, supra, except that 8.64 grams (0.12 mol) of mixed vicinal-epoxybutanes were used in lieu of ethylene oxide.

To a Pyrex test tube, there were charged 3 milliliters of the suspension prepared as described above, 15 grams of toluene, and 15 grams of ethylene oxide. The tube was sealed and then gently agitated at 90° C. for a period of 24 hours. A 10 minute induction period was observed. There was obtained a solid polymeric product which had a reduced viscosity value of 0.65. The conversion of monomer of polymer was 80 percent.

*Example 7*

A catalyst was prepared in the same manner as set forth in Example 1, supra, except that 7.4 grams (0.1 mol) of n-butanol were used in lieu of ethylene oxide.

To a Pyrex test tube, there were charged 15 grams of toluene, 15 grams of ethylene oxide, and an amount of the catalyst suspension prepared as described above (1.7 weight percent of contained calcium, based on the weight of ethylene oxide). The tube was sealed and then gently agitated at 90° C. for a period of 65 hours. There was obtained a polymeric product which had a reduced viscosity value of 0.2. The conversion of monomer to polymer was 87 percent.

*Example 8*

To a Pyrex test tube, there were charged 10.5 grams of ethylene oxide, 4.5 grams of propylene oxide, and a quantity of the suspension prepared according to Example 1, said suspension containing 0.26 gram of calcium calculated as the metal. The tube was sealed and then gently agitated at 90° C. for a period of 26 hours. The polymerization reaction commenced immediately. There was obtained a solid polymeric product which had a reduced viscosity value of 1.69. The conversion of monomer to polymer was 40 percent.

In an analogous manner as above, when equal parts by weight of the ethylene oxide and 1,2-epoxybutane are employed as the monomeric feed in lieu of the ethylene oxide and 1,2-propylene oxide feed, there is obtained a solid polymeric product.

*Example 9*

To a Pyrex test tube, there were charged 10.5 grams of ethylene oxide, 4.5 grams of styrene oxide, and a quantity of the suspension prepared according to Example 1, said suspension containing 0.26 gram of calcium calculated as the metal. The tube was sealed and then gently agitated at 90° C. for a period of 26 hours. There was obtained a solid polymeric product which had a reduced viscosity value of 2.24.

*Example 10*

Barium metal (4.17 grams) and ethylene glycol (50 grams) were reacted at elevated temperatures, followed by stripping from the reaction product mixture the excess ethylene glycol reagent, to yield barium glycoxide.

To a reaction vessel, there were charged ethylene oxide, 50 weight percent benzene, and 0.9 weight percent barium glycoxide prepared as described above, based on the weight of ethylene oxide. The polymerization reaction was conducted at 100° C. for a period of 16 hours. There was obtained a polymeric product which had a reduced viscosity value of 0.32. The yield was 16 percent.

*Example 11*

Calcium metal (5 grams) and ethylene glycol (100 grams) were reacted at elevated temperatures, followed by stripping from the reaction product mixture the excess ethylene glycol reagent, to yield calcium glycoxide.

To a reaction vessel, there were charged ethylene oxide, 50 weight percent benzene, and 0.1 weight percent calcium glycoxide prepared as described above, based on the weight of ethylene oxide. The polymerization reaction was conducted at 100° C. for a period of 16 hours. There was obtained a polymeric product which had a reduced viscosity value of 0.8. The yield was 3 percent.

Although the invention has been illustrated by the preceding examples, the invention is not to be construed as limited to the materials employed in the above-exemplary examples, but rather, the invention encompasses the generic area as hereinbefore disclosed. Various modifications and embodiments of this invention can be made without departing from the spirit and scope thereof.

What is claimed is:

1. A process which comprises reacting essentially equimolar quantities of an alkaline earth metal hexammoniate, an olefin oxide containing solely carbon, hydrogen and oxirane oxygen which is bonded to vicinal carbon atoms to form an epoxy group and a hydroxy-containing organic compound, selected from the group consisting of alkanols, cycloalkanols, alkanediols, cycloalkanediols and phenols, said reaction being conducted in excess liquid ammonia, and subsequently evaporating from the resulting product mixture the excess liquid ammonia.

2. The process of claim 1 wherein said hydroxy-containing organic compound is an alkanol containing up to four carbon atoms.

3. A process which comprises reacting essentially equimolar quantities of an alkaline earth metal hexammoniate, a lower olefin oxide containing solely carbon, hydrogen and oxirane oxygen which is bonded to vicinal carbon atoms to form an epoxy group and a hydroxy-containing organic compound, selected from the group consisting of alkanols, cycloalkanols, alkanediols, cycloalkanediols and phenols, said reaction being conducted in excess liquid ammonia, at a temperature in the range of from above the freezing point of ammonia to about $+133°$ C., under a pressure sufficient to maintain said ammonia in an essentially liquid state, and subsequently evaporating from the resulting product mixture the excess liquid ammonia.

4. The process of claim 3 wherein said reaction, being conducted in excess liquid ammonia, is conducted at a temperature in the range of from above about $-78°$ C. to about 25° C., under a pressure sufficient to maintain said ammonia in an essentially liquid state.

5. The process of claim 3 wherein said hydroxy-containing organic compound is an alkanol containing up to four carbon atoms.

6. The process of claim 3 wherein the solid product remaining after the evaporation of the excess liquid ammonia therefrom is slurried in an inert normally-liquid organic medium selected from the group consisting of the lower dialkyl ethers of the alkylene glycols, saturated aliphatic hydrocarbons, and saturated cycloaliphatic hydrocarbons.

7. A process which comprises reacting calcium hexammoniate with from about 0.8 to 1.0 mol of ethylene oxide and from about 1.2 to 1.0 mols of ethylene glycol, based on 1.0 mol of said hexammoniate, said reaction being conducted in excess liquid ammonia, at a temperature from above about $-78°$ C. to about 10° C., under a pressure sufficient to maintain said ammonia in an essentially liquid state.

8. A process which comprises reacting calcium hexammoniate with from about 0.8 to 1.0 mol of propylene oxide and from about 1.2 to 1.0 mols of ethylene glycol, based on 1.0 mol of said hexammoniate, said reaction being conducted in excess liquid ammonia, at a temperature from above about $-78°$ C. to about 10° C., under a pressure sufficient to maintain said ammonia in an essentially liquid state.

9. A process which comprises reacting essentially equimolar quantities of an alkaline earth metal hexammoniate, a lower olefin oxide selected from the group consisting of ethylene oxide, propylene oxide, 1,2-epoxybutane, and 2,3-epoxybutane, and an alkanediol containing up to four carbon atoms, said reaction being conducted in excess liquid ammonia, at a temperature in the range of from above about $-78°$ C. to about 25° C., under a pressure sufficient to maintain said ammonia in an essentially liquid state, and subsequently evaporating from the resulting product mixture the excess liquid ammonia.

10. The process of claim 9 wherein said alkanediol is ethylene glycol.

11. The process of claim 10 wherein said alkaline earth metal hexammoniate is calcium hexammoniate.

12. A process which comprises reacting an alkaline earth metal hexammoniate with from about 0.05 to 1.0 mol of an olefin oxide containing solely carbon, hydrogen and oxirane oxygen which is bonded to vicinal carbon atoms to form an epoxy group and from about 1.95 to 1.0 mols of an alkanediol containing up to four carbon atoms, based on 1.0 mol of said alkaline earth metal hexammoniate, said reaction being conducted in excess liquid ammonia, and subsequently evaporating from the resulting product mixture the excess liquid ammonia.

13. A process which comprises reacting an alkaline earth metal hexammoniate with from about 0.8 to 1.0 mol of a lower olefin oxide containing solely carbon, hydrogen and oxirane oxygen which is bonded to vicinal carbon atoms to form an epoxy group and from about 1.2 to 1.0 mol of an alkanediol containing up to four carbon atoms, based on 1.0 mol of said alkaline earth metal hexammoniate, said reaction being conducted in excess liquid ammonia, at a temperature in the range of from about the freezing point of ammonia to about $+133°$ C., under a pressure sufficient to maintain said ammonia in an essentially liquid state, and subsequently evaporating from the resulting product mixture the excess liquid ammonia.

References Cited by the Examiner

UNITED STATES PATENTS

| | | | |
|---|---|---|---|
| 2,341,565 | 2/44 | Lyman et al. | 260—632 |
| 2,369,524 | 2/45 | Berg et al. | 252—431 |
| 2,715,057 | 8/55 | Pryde | 260—632 |
| 2,844,545 | 7/58 | Borbovec | 260—2 |
| 2,861,962 | 11/58 | Borkovec | 260—2 |
| 2,866,761 | 12/58 | Hill et al. | 260—2 |
| 2,939,846 | 6/60 | Gordon et al. | 252—431 |
| 2,969,402 | 1/61 | Hill et al. | 252—431 X |
| 2,971,988 | 2/61 | Hill et al. | 252—431 |

TOBIAS E. LEVOW, *Primary Examiner.*

PHILIP E. MANGAN, JULIUS E. GREENWALD, SAMUEL H. BLECH, *Examiners.*